Sept. 26, 1950          M. H. NEWELL          2,523,478

MEDICATOR FOR COWS' TEATS

Filed March 17, 1948          2 Sheets-Sheet 1

INVENTOR
M. H. Newell
BY
ATTORNEYS

Sept. 26, 1950 — M. H. NEWELL — 2,523,478
MEDICATOR FOR COWS' TEATS
Filed March 17, 1948 — 2 Sheets-Sheet 2

INVENTOR
M. H. Newell
BY
ATTORNEYS

Patented Sept. 26, 1950

2,523,478

UNITED STATES PATENT OFFICE 2,523,478

MEDICATOR FOR COWS' TEATS

Marvin H. Newell, Stockton, Calif.

Application March 17, 1948, Serial No. 15,367

8 Claims. (Cl. 128—248)

This invention relates to, and it is an object to provide, an improved medicator for applying fluid treatments to the teats of cows to maintain the teats in proper condition or milking and to prevent the spread of diseases such as mastitus.

The present invention is a modification of the device shown in United States Patent No. 2,350,183, issued May 30, 1944.

Another object of the invention is to provide a medicator for cows' teats which is constructed primarily of transparent material whereby to permit the operator to visually ascertain the amount of liquid medicament in the tank, and in the teat reception chamber.

Another object is to provide a medicator for cows' teats which includes a pump incorporating a novel pump assembly; one member of said assembly forming the upwardly opening, teat reception chamber.

It is also an object to provide a device, or the purpose described, wherein the pump assembly is removable, in the main, from the tank for filling the latter, or for cleaning and sterilization of the parts of the device.

An additional object of the invention is to provide the device with a novel arrangement for wiping excess liquid from a cows' teat before its withdrawal from the teat reception chamber; thus effecting substantial savings in the use of liquid ointments or lotions.

A further object of the invention is to provide a practical and convenient medicator for cows' teats, and yet one which will be exceedingly effective for the purpose for which it is designed.

These objects are accomplished by means of such structure and relative arrangement of parts as will fully appear by a perusal of the following specification and claims.

Figure 1:
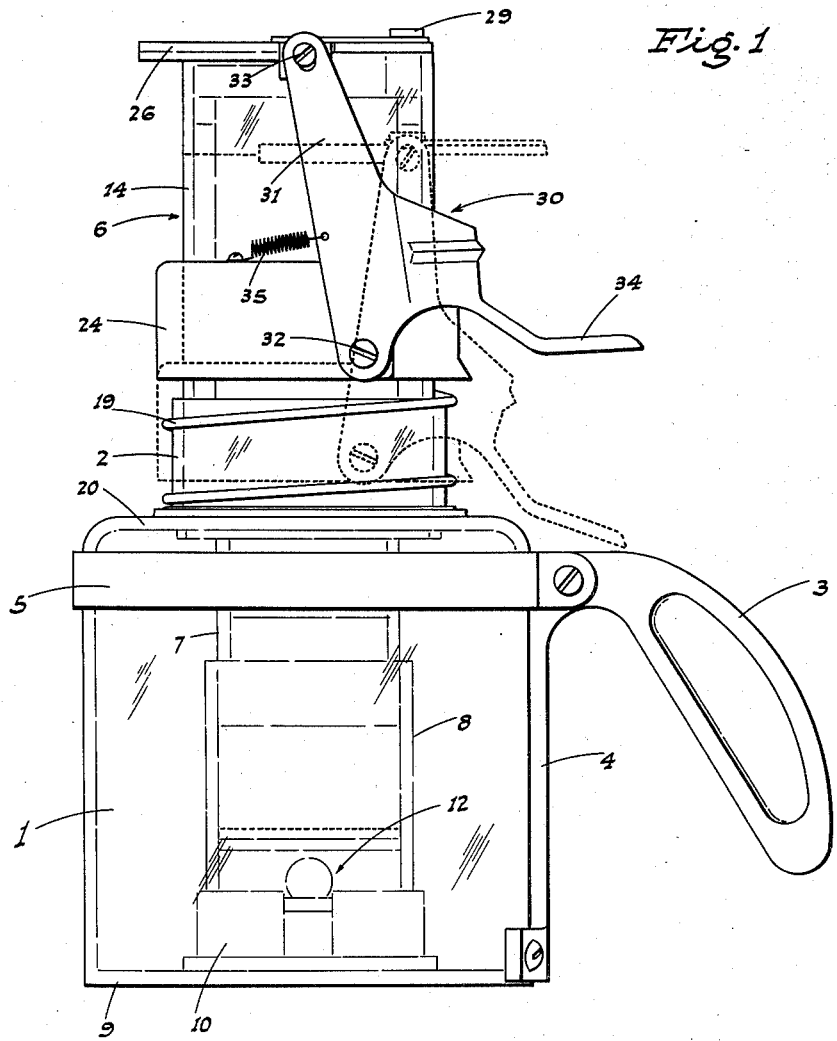
Fig. 1 is a side elevation of the medicator.
Figure 2:
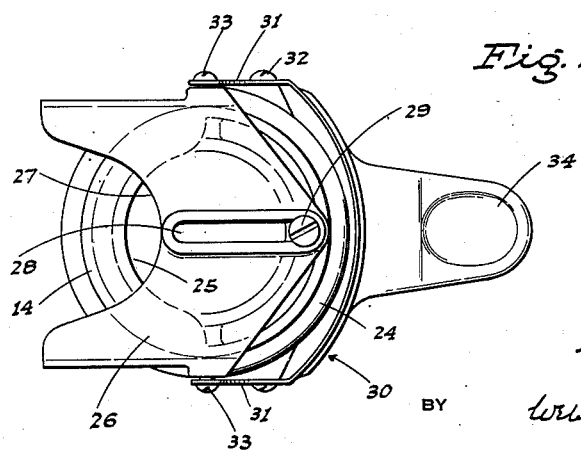
Fig. 2 is a top plan view of the pump assembly, detached.

Referring now more particularly to the characters of reference on the drawings, the medicator comprises a tank, indicated at 1, which tank includes a top opening defined by an upstanding neck 2 of substantial diameter. The tank 1 is fitted, on one side thereof, with an outwardly and downwardly inclined handle 3; such handle including an attachment leg 4 attached to the tank, while an attachment band 5 encircles said tank. With this handle arrangement the device can be effectively supported and manipulated.

Upstanding from the tank 1 is a finger-actuated pump assembly, indicated generally at 6, such assembly comprising the following structural arrangement:

A vertical elongated pump sleeve 7 extends from a point above the tank, downwardly through the neck 2, in substantial clearance relation, into said tank; the lower end portion of said pump sleeve 7 running with a close sliding fit in a fixed pump sleeve 8 mounted in upstanding relation in connection with, but spaced above, the bottom 9 of the tank 1 by means of a vertical sider 10. Adjacent the lower ends thereof the vertically movable pump sleeve 7 and the fixed pump sleeve 8 are provided with a check valve unit; said check valve units being indicated at 11 and 12, respectively, and both closing downwardly.

It will be recognized that the sleeves 7 and 8, mounted as described and including the check valve units 11 and 12, form a pump whereby upon reciprocation of the sleeve 7 liquid from within the tank 1 can be pumped upwardly to, and maintained in, the upper portion of said sleeve 7 above the check valve unit 11. The interior of the pump sleeve 7 above said check valve unit 11 forms an upwardly opening teat reception chamber 13.

An external guide sleeve 14 surrounds the pump sleeve 7 in spaced relation and from a point slightly above the upper end of the latter downwardly to a point normally slightly below the neck 2; said external guide sleeve 14 running in close guided relation in said neck. The pump sleeve 7 is affixed to the guide sleeve 14, at vertically spaced points, by upper and lower spiders 15 and 16, respectively.

The space between the sleeves 7 and 14 provides a return flow passage 17, opening at its lower end into the tank 1; the sleeve 7 having an overflow port 18 therethrough adjacent but short of its upper end.

Figures 3, 4:
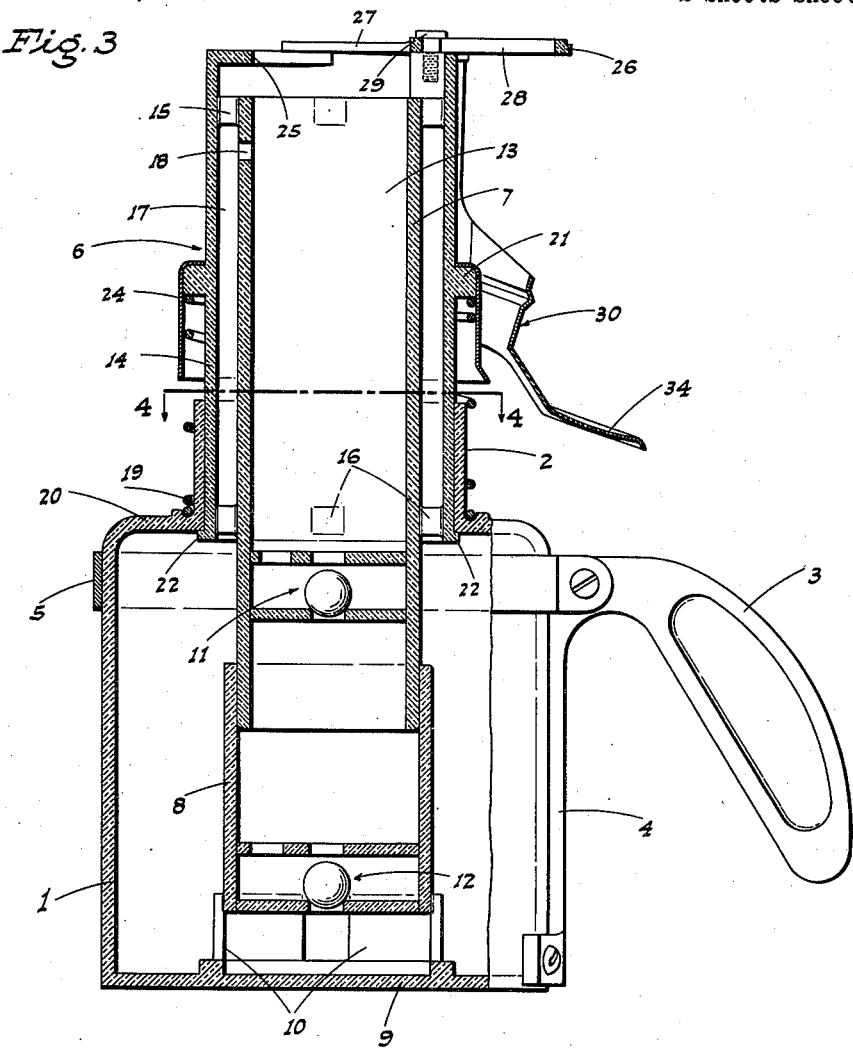
Fig. 3 is a sectional elevation of the device.
Fig. 4 is a cross section on line 4—4 of Fig. 3.

A relatively large-diameter, light-weight compression spring 19 engages between the top 20 of the tank 1 and an annular flange 21 on the guide sleeve 14 above the neck 2; said spring normally but yieldably acting to maintain the pump assembly 6 in its raised position, as in full lines in Figs. 1 and 3. Upward movement of the sleeve 7 beyond its normal position is prevented by opposed outturned feet 22 on the lower end of the guide sleeve 14, which feet normally bear against the lower end of the neck 2. The pump assembly 6, including the interconnected pump sleeves 7 and 14, is removable from the tank by turning said assembly 90°, whereby the feet 22 register with, and can slide upwardly through, vertical grooves 23 in opposite sides of said neck 2. In this manner the major parts of the device can be separated for cleaning and sterilization; the connecting means being in effect a bayonet lock arrangement.

The annular flange 21 carries a depending annular skirt 24 which encircles the upper portion of the spring 19 in protective and holding relation; said skirt also serving as an attachment mount for certain parts of the device, as will hereinafter appear.

At its upper end, which is above the corresponding end of the pump sleeve 7, the external guide sleeve 14 is formed with a semi-circular wiping lip 25, and a horizontal slide 26 works across the upper end of said guide sleeve 14 from the opposite side; said slide 26 including a semi-circular wiping lip 27 opposed, but in cooperative relation, to the wiping lip 25. The slide 26 includes a guide slot 28, through which a guide screw 29 engages. The slide 26 is movable by reason of the described arrangement, from a normally closed position overlying the upper end of the teat reception chamber 13 outwardly to a position exposing said chamber.

A saddle-like double-legged bellcrank lever 30 straddles the pump assembly 6 from the side directly above the handle 3. The legs 31 of the bellcrank lever 30 are thus disposed on opposite sides of said assembly and are pivoted, at their lower ends, as at 32, to opposite sides of the skirt 24. At their upper ends the legs 31 are pivoted, as at 33, in longitudinally loose-play relation to opposite sides of the slide 26.

The bellcrank lever 30 includes an outwardly projecting trigger 34 disposed in spaced relation directly above the handle 3, and tension springs 35, connected between the skirt 24 and lever 30, act to swing the latter in a direction to normally maintain the slide 26 closed over the teat reception chamber 13.

The above described medicator is used in the following manner:

With a quantity of liquid medicament in the tank 1 the device is held in the hand by means of the handle 3, with the thumb of the same hand on the trigger 34. Depression of the trigger 34 full-down several times, to the position shown in dotted lines in Fig. 1, causes the pump assembly 6 to function, including reciprocation of the pump sleeve 7, delivering a quantity of such liquid into the teat reception chamber 13 above the check valve unit 11.

Thereafter, the trigger 34 is depressed only part-down so as to cause only opening of the slide 22 by the bellcrank lever 30; opening of the slide exposing the teat reception chamber 13 for use.

With the parts in the above position, the device is manipulated beneath the cow's udder to effect entry of one of the teats into the chamber 13. When this occurs, the liquid medicament previously pumped into said chamber 13 is fully effectively applied to the teat; any excess liquid escaping through the overflow port 18 and returning through the passage 17 into the tank 12. Also, should any of the liquid overflow the upper end of the pump sleeve 7, it may similarly return to the tank.

When the teat within the chamber 13 has been annointed by the liquid medicament, the operator then releases the trigger 34, permitting the slide 26 to work under the tension of springs 35 in a direction against the teat; the latter thus being engaged on one side by the semi-circular wiping lip 27 and on the other side by the semi-circular wiping lip 25. Thereafter, the entire device is lowered, the aforesaid wiping lips stripping from the teat all excess medicament thereon.

The major parts of the device, including the tank 1, together with the sleeves 7 and 14, are constructed of a transparent material, such as plastic, to the end that the operator may view the quantity of liquid medicament in said tank, or in the chamber 13. Additionally, the plastic provides for sturdiness and relative unbreakability. The construction of the applicator is such that being mainly of plastic, the fluid does not contact any metal parts, thus avoiding corrosion and preventing chemical reaction upon the fluid.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A portable medicator for cow teats, comprising a tank adapted to receive a fluid, an upstanding, external sleeve mounted in connection with the tank for guided vertical reciprocation, a pump sleeve secured in the external sleeve and depending into the tank, a pump unit in the tank including the lower end portion of the pump sleeve adapted to pump fluid from the tank into the upper portion of said pump sleeve, said upper portion of the pump sleeve being open upwardly and forming a cow teat reception chamber, and a hand actuated means operative to vertically reciprocate the external sleeve so as to cause the pump unit to feed fluid from the tank to said chamber; said external sleeve and tank having cooperating means normally but releasably securing said sleeve against removal from the tank.

2. A portable medicator for cow teats, comprising a tank adapted to receive a fluid, an upstanding neck included on the tank, an external sleeve slidably mounted in and projecting above the neck, a compression spring surrounding the neck and engaged between the tank and said sleeve normally urging the latter upward to a raised position, stop means to prevent motion of the external sleeve above said position, a pump sleeve secured in the external sleeve and depending into the tank, a pump unit in the tank including the lower end portion of the pump sleeve adapted to pump fluid from the tank into the upper portion of said pump sleeve, said upper portion of the pump sleeve being open upwardly and forming a cow teat reception chamber, and hand actuated means operative to vertically reciprocate the external sleeve so as to cause the pump unit to feed fluid from the tank to said chamber.

3. A portable medicator, as in claim 2, in which said stop means includes a lateral foot on the external sleeve normally engaging the lower end of said neck; the latter having a vertical groove normally circumferentially spaced from the foot but through which said foot may pass, upon predetermined rotation of the sleeve assembly, to permit said assembly to be withdrawn from the tank.

4. A portable medicator for cow teats, comprising a tank adapted to receive a fluid, an upstanding neck included on the tank, an external sleeve slidably mounted in and projecting above the neck, a compression spring surrounding the neck and engaged between the tank and said sleeve normally urging the latter upward to a raised position, stop means to prevent motion of the external sleeve above said position, a pump sleeve secured in the external sleeve and depending into the tank, a pump unit in the tank including the lower end portion of the pump sleeve adapted to pump fluid from the tank into the upper portion of said pump sleeve, said upper portion of the pump sleeve being open upwardly and forming a cow teat reception chamber, and hand actuated means operative to vertically reciprocate the external sleeve so as to cause the pump unit to feed fluid from the tank to said chamber; there being an annular flange on the external sleeve above the neck, and against which flange the adjacent end of the spring seats, and a protective annular skirt depending from the annular flange about the spring.

5. A portable medicator for cow teats, comprising a tank adapted to receive a fluid, an upstanding neck included on the tank, an external sleeve slidably mounted in and projecting above the neck, a compression spring surrounding the neck and engaged between the tank and said sleeve normally urging the latter upward to a raised position, stop means to prevent motion of the external sleeve above said position, a pump sleeve secured in the external sleeve and depending into the tank, a pump unit in the tank including the lower end portion of the pump sleeve adapted to pump fluid from the tank into the upper portion of said pump sleeve, said upper portion of the pump sleeve being open upwardly and forming a cow teat reception chamber, a closure member movably mounted on the top of the external sleeve normally overlying the teat reception chamber, and an actuating member projecting from the external sleeve operative to move the same downward against the action of the spring; said actuating member being capable of initial upward motion relative to the external sleeve, and a connection between the actuating member and closure member operative to open the latter upon such initial upward motion of the actuating member.

6. A portable medicator, as in claim 5, in which said closure member and the upper end of the pump sleeve include opposed but cooperative arcuate wiping lips adapted to work against opposite sides of a cow teat as withdrawn from the chamber; there being a spring urging the closure member across the chamber.

7. A portable medicator for cow teats, comprising a tank adapted to receive a fluid, an upstanding neck included on the tank, an external sleeve slidably mounted in and projecting above the neck a compression spring surrounding the neck and engaged between the tank and said sleeve normally urging the latter upward to a raised position, stop means to prevent motion of the external sleeve above said position, a pump sleeve secured in the external sleeve and depending into the tank, a pump unit in the tank including the lower end portion of the pump sleeve adapted to pump fluid from the tank into the upper portion of said pump sleeve, said upper portion of the pump sleeve being open upwardly and forming a cow teat reception chamber, a saddle-like, double-legged, bellcrank lever straddling the external sleeve above the neck, the lever legs upstanding, a finger member projecting laterally from the bellcrank lever, the tank having a handle below the finger member, the latter being manually accessible from said handle, means pivoting the lever legs in connection with the external sleeve above the neck, a slide guidably mounted on top of the external sleeve for lateral shifting motion from a normal position overlying the chamber, and means pivoting the upper ends of the lever legs to the slide in actuating relation to the latter.

8. A portable medicator for cow teats, comprising a tank adapted to receive a fluid, a pump assembly mounted in connection with the tank and upstanding therefrom in reciprocable relation, the pump assembly including a cow teat reception chamber which opens upwardly above the tank, the chamber being supplied with fluid from the tank by operation of the pump assembly, means arranged to cause operation of the pump, a closure member mounted on the upper end of the pump assembly in overlying relation to the chamber and including opposed but cooperative, arcuate wiping lips adapted to work on opposite sides of a cow teat as the same is withdrawn from the chamber, and means operative to effect the opening of said closure member upon operation of the pump assembly.

MARVIN H. NEWELL.

REFERENCES CITED

The following references are of record in the file of this patent:

UNITED STATES PATENTS

| Number | Name | Date |
|---|---|---|
| 25,217 | Robjohn | Aug. 23, 1859 |
| 1,361,007 | Brown | Dec. 7, 1920 |
| 1,854,814 | Terry | Apr. 19, 1932 |
| 1,875,902 | Wickwire, Jr. | Sept. 6, 1932 |
| 1,916,186 | Meunier | June 27, 1933 |
| 2,170,699 | Terry | Aug. 22, 1939 |
| 2,378,624 | Edwards | June 19, 1945 |

FOREIGN PATENTS

| Number | Country | Date |
|---|---|---|
| 244,676 | Germany | Mar. 15, 1912 |